US008758958B2

(12) United States Patent
Breault et al.

(10) Patent No.: US 8,758,958 B2
(45) Date of Patent: Jun. 24, 2014

(54) FUEL CELL SEPARATOR PLATE ASSEMBLY

(75) Inventors: Richard D. Breault, North Kingstown, RI (US); Warren L. Luoma, Manchester, CT (US); Robert P. Roche, Cheshire, CT (US)

(73) Assignee: ClearEdge Power, LLC, South Windsor, CT (US)

( * ) Notice: Subject to any disclaimer, the term of this patent is extended or adjusted under 35 U.S.C. 154(b) by 439 days.

(21) Appl. No.: 12/856,732

(22) Filed: Aug. 16, 2010

(65) Prior Publication Data

US 2010/0307681 A1 Dec. 9, 2010

Related U.S. Application Data

(63) Continuation of application No. 11/718,336, filed as application No. PCT/US2004/044007 on Dec. 29, 2004, now abandoned.

(51) Int. Cl.
*H01M 8/04* (2006.01)
*H01M 8/24* (2006.01)

(52) U.S. Cl.
USPC .............................. 429/514; 429/457; 429/512

(58) Field of Classification Search
None
See application file for complete search history.

(56) References Cited

U.S. PATENT DOCUMENTS

| 4,988,583 | A |   | 1/1991  | Watkins et al. |        |
|-----------|---|---|---------|----------------|--------|
| 5,300,370 | A | * | 4/1994  | Washington et al. | 429/434 |
| 5,558,955 | A |   | 9/1996  | Breault et al. |        |
| 6,050,331 | A |   | 4/2000  | Breault et al. |        |
| 6,296,964 | B1 |  | 10/2001 | Ren et al.     |        |
| 6,613,252 | B2 |  | 9/2003  | Norley et al.  |        |
| 7,494,740 | B2 |  | 2/2009  | Bonnet et al.  |        |
| 2001/0055710 | A1 | * | 12/2001 | Saito et al.   | 429/34 |
| 2005/0142413 | A1 |   | 6/2005  | Kimura et al.  |        |
| 2006/0183013 | A1 |   | 8/2006  | Inagaki et al. |        |
| 2008/0057373 | A1 |   | 3/2008  | Breault et al. |        |

FOREIGN PATENT DOCUMENTS

| EP | 0683536 A1 | 11/1995 |
|----|-----------|---------|
| JP | 2001015131 A | 1/2001 |
| JP | 2003168444 | 6/2003 |
| JP | 2004119346 | 4/2004 |
| WO | 0243173 A1 | 5/2002 |
| WO | 03069707 A1 | 8/2003 |

OTHER PUBLICATIONS

Supplemental European Search Report for Application No. EP 04 81 5992 mailed Mar. 26, 2009.

(Continued)

*Primary Examiner* — Barbara Gilliam
*Assistant Examiner* — Adam A Arciero
(74) *Attorney, Agent, or Firm* — Carlson, Gaskey & Olds

(57) ABSTRACT

A fuel cell separator plate assembly (20) includes a separator plate layer (22) and flow field layers (24, 26). In one disclosed example, the separator plate layer (22) comprises graphite and a hydrophobic resin. The hydrophobic resin of the separator plate layer (22) serves to secure the separator plate layer to flow field layers on opposite sides of the separator plate layer. In one example, at least one of the flow field layers (24, 26) comprises graphite and a hydrophobic resin such that the flow field layer is hydrophobic and nonporous. In another example, two graphite and hydrophobic resin flow field layers are used on opposite sides of a separator plate layer. One disclosed example includes all three layers comprising graphite and a hydrophobic resin.

5 Claims, 1 Drawing Sheet

(56) References Cited

OTHER PUBLICATIONS

International Preliminary Examination Report for International application No. PCT/US04/44007 mailed Sep. 6, 2007.

International Search Report and Written Opinion for International application No. PCT/US04/44007 mailed Jul. 20, 2005.

International Search Report and Written Opinion of the International Searching Authority for International application No. PCT/US2011/000037 dated Sep. 26, 2011.

* cited by examiner

FUEL CELL SEPARATOR PLATE ASSEMBLY

CROSS-REFERENCE TO RELATED APPLICATIONS

This application is a continuation of U.S. application Ser. No. 11/718,336 filed May 2, 2007, now abandoned which is the U.S. National Phase of the Patent Cooperation Treaty Application PCT/US04/44007 filed on Dec. 29, 2004.

FIELD OF THE INVENTION

This invention generally relates to fuel cells. More particularly, this invention relates to separator assemblies for fuel cells.

DESCRIPTION OF THE RELATED ART

Fuel cells are well known. An anode and a cathode operate in a known manner to produce electrical energy under appropriate operating conditions. The cathode and anode are typically separated by a separator plate that is electrically conductive to conduct electrons but isolate the electrolyte and reactants of adjacent cathodes and anodes.

Traditionally, separator plates have been bonded to a cathode flow field plate of one cell and the anode flow field plate of an adjacent cell. Typical bonding methods included fluorocarbon films because typical separator plates were made of carbon. Typical flow field plates were made of carbon-carbon composites. In most arrangements, the flow field plates are porous and hydrophilic so that they serve as an electrolyte reservoir plate in which excess electrolyte can be stored in a known manner.

There are recognized drawbacks associated with such arrangements. One improvement is shown in U.S. Pat. No. 5,558,955, which introduces a cathode flow field plate that is essentially non-porous and hydrophobic. The arrangement disclosed in that document represents an improvement over the traditional carbon-carbon flow field plates on both sides of the carbon separator plate.

Those skilled in the art are always striving to make improvements. For example, it would be advantageous to provide a more cost-effective separator plate assembly.

This invention provides an improved separator plate assembly that avoids the shortcomings and drawbacks of traditional arrangements and enhances the economies associated with such assemblies.

SUMMARY OF THE INVENTION

An example separator plate assembly for use in a fuel cell includes a separator plate layer. A first non-porous, hydrophobic flow field layer includes a hydrophobic resin that secures the first flow field layer to a first side of the separator plate layer. A second non-porous, hydrophobic flow field layer includes a hydrophobic resin that secures the second flow field layer to a second side of the separator plate layer.

In one example, the first and second flow field layers comprise natural graphite flakes and the hydrophobic resin.

In one example, the separator plate layer comprises graphite and a hydrophobic resin. In this example, the hydrophobic resin of the separator plate layer also serves to secure the flow field layers to the opposite sides of the separator plate layer.

In another example, the separator plate is a carbon separator plate.

Another example separator plate assembly for use in a fuel cell includes a separator plate layer comprising graphite and a hydrophobic resin. First and second flow field layers are respectively secured to opposite sides of the separator plate layer by at least the hydrophobic resin of the separator plate layer. In one example, at least one of the flow field layers comprises graphite and a hydrophobic resin. In another example, at least one of the flow fields is a porous graphite. In another example, both flow field layers comprise graphite and a hydrophobic resin.

In another example, the separator plate assembly is a monolithic structure having a consistent material composition throughout the entire assembly. In such an example, there is no material demarcation between the separator plate layer and the flow field layers.

An example method of making a separator plate assembly for use in a fuel cell includes forming a separator plate layer. At least one non-porous, hydrophobic flow field layer is formed using graphite and a hydrophobic resin. The example method includes securing the flow field layer to the separator plate layer using at least the hydrophobic resin of the flow field layer.

In one example, forming the separator plate layer includes using graphite and a hydrophobic resin. In such examples, the hydrophobic resin of the separator plate layer and the hydrophobic resin of the flow field layer secure the two layers together.

The various features and advantages of this invention will become apparent to those skilled in the art from the following detailed description of currently preferred embodiments. The drawings that accompany the detailed description can be briefly described as follows.

DETAILED DESCRIPTION OF THE PREFERRED EMBODIMENTS

Figure 1:
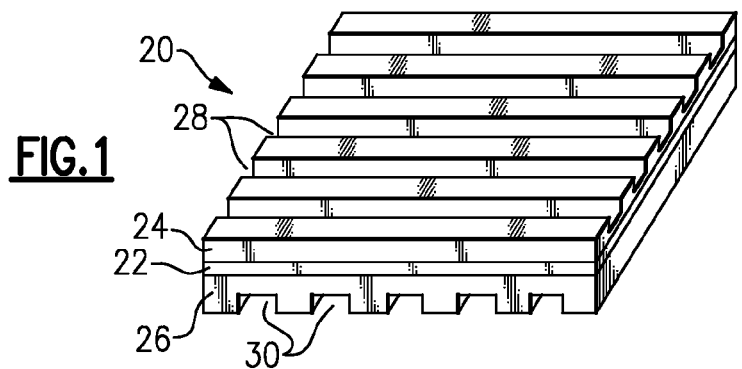
FIG. 1 is a diagrammatic, perspective illustration of an example separator plate assembly designed according to an embodiment of this invention.

FIG. 1 shows a separator plate assembly 20 that is useful in fuel cells. The example separator plate assembly 20 includes a separator plate layer 22. A first flow field layer 24 is secured to one side of the separator plate layer 22. A second flow field layer 26 is secured to a second, oppositely facing side of the separator plate layer 22.

The flow field layers 24 and 26 each include flow channels that are machined or formed into the flow field layers in a known manner. The first flow field layer 24 includes a plurality of flow channels 28 while the second flow field layer 26 includes a plurality of channels 30. The channels are preferably arranged in a perpendicular orientation relative to each other as can be appreciated from FIG. 1.

The materials selected for forming the different layers of the separator plate assembly 20 may vary to meet the needs of a particular situation. Several unique combinations are disclosed as example embodiments of this invention.

In one example, the separator plate layer 22 comprises graphite and a hydrophobic resin. In one example, the graphite comprises natural graphite flakes and the hydrophobic resin comprises a fluorocarbon resin. The natural graphite flakes in one example are thermally purified such as grade SGC 2900 obtained from Superior Graphite Company of Chicago, Ill. to minimize corrosion of the graphite. One example fluorocarbon resin is commercially available from the DuPont Company and is sold under the trade name FEP TEFLON. PFA TEFLONS are also suitable.

One example separator plate layer 22 comprises between 70% and 80% graphite flakes and a corresponding, remaining percentage of the hydrophobic resin. One preferred example includes 25% hydrophobic resin and 75% graphite flakes.

One advantage to using graphite and a hydrophobic resin for forming a separator plate layer 22 is that the hydrophobic resin within the separator plate layer 22 can be used for securing one or more of the flow field layers 24, 26 to the separator plate layer 22. Such an arrangement eliminates intermediate films between the layers during a manufacturing process, which provides cost savings from a material and labor standpoint.

Another example separator plate assembly includes the separator plate layer 22 formed of graphite and a hydrophobic resin. At least one of the flow field layers 24, 26 comprises graphite and a hydrophobic resin. A different mixing ratio of graphite and hydrophobic resin is used for the flow field layer compared to the separator plate layer. In one example, the flow field layer 24 comprises approximately 11% FEP TEFLON hydrophobic resin and approximately 89% flake graphite. The separator plate layer 22 in that example comprises 75% graphite and 25% FEP TEFLON.

In another example, one of the flow fields comprises porous graphite. In one example, the separator plate layer 22 comprises 75% graphite and 25% resin, the flow field layer 26 comprises 89% graphite and the flow field layer 24 comprises porous graphite.

It is desirable to use a higher concentration of hydrophobic resin in the separator plate layer 22 to achieve a sufficiently low rate of hydrogen diffusion across the separator plate layer. Further, a sufficiently high hydrophobic resin content in the separator plate layer 22 provides a sufficiently low rate of acid transfer through the separator plate. A separator plate layer designed according to an embodiment of this invention provides uniquely low acid transfer rates compared to previous arrangements.

In one example, both of the flow field layers 24 and 26 are formed using graphite and a hydrophobic resin. With such an arrangement, the hydrophobic resin of each layer is used to bond that layer to the corresponding adjacent layer. Again, using the hydrophobic resin of at least one of the layers to secure that layer to the next layer eliminates the requirement of using separate films, resins or adhesives for securing the various layers together.

In one example, the separator plate layer 22 also comprises graphite and a hydrophobic resin. The hydrophobic resin may be any thermoplastic resin which is chemically and physically compatible with the operating environment of the fuel cell and has a surface energy of less than 25 DYNE/cm.

One example assembly includes a separator plate layer 22 comprising between about 15% and about 30% TEFLON FEPTE9050 available from the DuPont Company. A remaining, corresponding percentage of thermally purified flake graphite grade #2901C from the Superior Graphite Company completes the formulation of the separator plate layer 22. In one preferred example, approximately 25% of the TEFLON FEP hydrophobic resin is used with approximately 75% flake graphite. This preferred formulation provides a thermal conductivity of 4.2 BTU/hr/ft/F, an electrical resistance that results in a voltage drop of 0.055 mV per mil of thickness at a current of 100 AMPS per square foot (ASF), a porosity of approximately 2-3%, a median pore size of 0.005 microns, a surface energy of approximately 35 Dynes/cm, a coefficient of thermal expansion of approximately 5-10 ppm/F and a corrosion current at 1150 mV for 100 minutes of approximately 0.5 uA/mg in 100% $H_3PO_4$ at 400° F.

In another example, the two flow field layers 24 and 26 each comprise graphite and hydrophobic resin. The separator plate layer 22 comprises carbon and is formed as a traditional separator plate layer.

Another example separator plate assembly 20 includes a monolithic structure where the flow fields 24, 26 and the separator plate layer 22 have a uniform composition and there are no discrete zones in the separator plate assembly. In other words, the separator plate assembly 20 in this example has a consistent material composition throughout the assembly and there is no material or physical demarcation between the layers 22, 24 and 26.

The example separator plate 20 comprises flake graphite and a hydrophobic resin. In one example, the monolithic separator plate assembly 20 comprises approximately 15-25% hydrophobic resin and the balance flake graphite. One preferred composition is 20% hydrophobic resin and the balance thermally purified flake graphite.

Figure 2A:
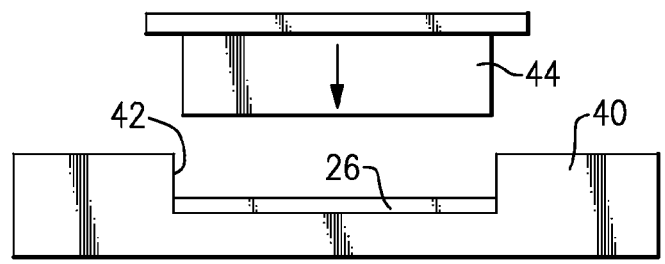
FIGS. 2A-2C schematically illustrate an example method of making a separator plate assembly designed according to an embodiment of this invention.
Figure 2B:
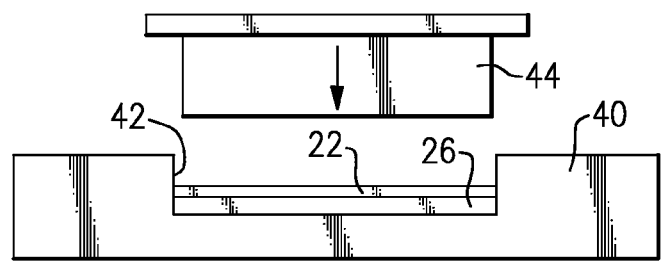
Figure 2C:
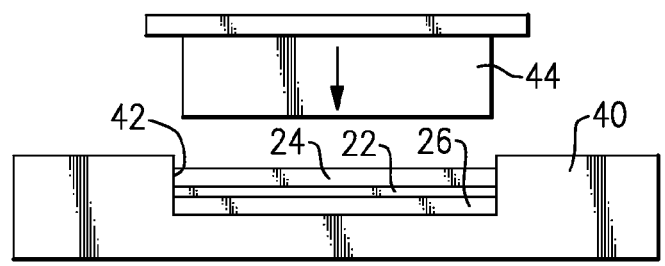

Referring to FIGS. 2A-2C, example methods of making such separator plate assemblies include using a mold 40 having a mold cavity 42 and a cooperating plunger 44 to form the various layers of the assembly. As schematically shown in FIG. 2A, the flow field layer 26 can be preformed in the mold 40 by depositing an appropriate amount of the selected material mixture to form the flow field layer 26. For purposes of discussion, the example method to be described includes using graphite and a hydrophobic resin for all three layers of the separator plate assembly. In this example, an appropriate mixture of graphite and hydrophobic resin is inserted into the mold cavity 42. The mold plunger 44 compresses the mixture at a suitable pressure, such as 2,000 psi.

As schematically shown in FIG. 2B, a graphite and hydrophobic resin mixture is then deposited on top of the compacted material of the flow field layer 26 to establish a layer of material to form the separator plate layer 22. As mentioned above, the graphite-to-resin mixture ratio for the separator plate layer 22 preferably includes a higher amount of the hydrophobic resin to achieve the gas diffusion and acid transfer rates that are advantageous as mentioned above. Once the material for the separator plate layer 22 is dispensed into the mold cavity 42, the plunger 44 compresses that layer and the flow field layer 26 at a suitable pressure such as 2,000 psi to compact both layers.

As schematically shown in FIG. 2C, a layer of graphite and hydrophobic resin mixture is deposited into the mold cavity 42 adjacent the compacted layer of material for establishing the separator plate layer 22. The flow field layer 24 in the illustrated example is deposited on top of the compacted material for the separator plate layer 22. The plunger 44 then compacts all three layers using a suitable pressure such as 2,000 psi.

Once all layers are compacted and adjacent each other in the desired arrangement, the entire assembly is heated in one example to a temperature of approximately 650° F. at a pressure of 750 psi for approximately twenty minutes. The entire assembly is then subsequently cooled at the same pressure to less than 400° F. Additional cool down to an ambient temperature can be performed at a lower pressure (i.e., less than 750 psi). Heating the assembly to 650° F. melts the hydrophobic resin and permits it to flow into the voids between the graphite particles. This minimizes the porosity of the layer. Cooling the layer to 400° F. solidifies the molten resin and causes the graphite particles and layers to bond.

The entire assembly can then be removed from the mold cavity 42 and any release films used on the outward most surfaces of the assembly can then be removed. Flow field channels can then be machined or formed into the flow field layers in a known manner.

In an example where only the separator plate layer 22 comprises graphite and a hydrophobic resin, the flow field layers may be preformed and the compaction described above may only be needed after depositing the material for the separator plate layer 22 into the mold cavity.

In another example, the powders for layers 26, 22, 24 are sequentially loaded into the mold without using any compaction at room temperature.

In an example where only one of the flow field layers comprises graphite and a hydrophobic resin, the heating sequence described above may be used after completing the steps schematically shown in FIG. 2B, for example, to provide a subassembly that can then be secured to another flow field layer using known techniques.

In another example, the separator plate assembly 20 is compressed using a double belt press that operates in a known manner.

Providing non-porous, hydrophobic flow field layers on opposite sites of a separator plate layer and using a hydrophobic resin of the flow field layers for securing them to the separator plate layer provides an improved arrangement as described above. Improved performance and cost savings are possible with such an arrangement. Additionally, utilizing a separator plate layer comprising graphite and a hydrophobic resin provides improved performance and cost-savings. A combination of one or more such layers can be used to meet the needs of a particular situation. Those skilled in the art who have the benefit of this description will be able to decide what combination will best work for their situation.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of making a separator plate assembly for use in a fuel cell, comprising the steps of:

forming at least one flow field layer using flake graphite and a hydrophobic resin;

forming a separator plate layer as a distinct layer adjacent the formed flow field layer using flake graphite and a hydrophobic resin; and securing the separator plate layer directly to the flow field layer using the hydrophobic resin of at least one of the formed layers, the resulting separator plate layer and flow field layer are non-porous and hydrophobic and a material composition of the assembly is consistent throughout the assembly, the material composition comprising an amount of the hydrophobic resin and an amount of the flaked graphite.

2. The method of claim 1, including forming two nonporous, hydrophobic flow field Layers using flake graphite and hydrophobic resin and securing the flow field layers directly to opposite sides of the separator plate layer, respectively, using the hydrophobic resin of the respective flow field layers.

3. The method of claim 1, including compacting the flake graphite and hydrophobic resin for forming the flow field layer;

compacting additional flake graphite and hydrophobic resin for forming the separator plate layer adjacent the compacted material of the flow field layer; and heating the compacted materials to secure the separator plate layer directly to the flow field layer.

4. The method of claim 3, including compacting additional flake graphite and hydrophobic resin for forming a second nonporous, hydrophobic flow field layer on an opposite side of the compacted separator plate layer prior to the heating; and securing the two flow field layers directly to the separator plate layer using the hydrophobic resins of the separator plate layer and the flow field layers, respectively.

5. The method of claim 1, wherein each of the first and second flow field layers comprises up to approximately 89% flake graphite and a corresponding amount of hydrophobic resin.

* * * * *